(12) United States Patent
Houston

(10) Patent No.: US 6,891,528 B2
(45) Date of Patent: May 10, 2005

(54) INTERCHANGEABLE KEYBOARD WITH SELF DEFINING KEYS

(75) Inventor: John S. Houston, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 09/841,673

(22) Filed: Apr. 24, 2001

(65) Prior Publication Data

US 2002/0154038 A1 Oct. 24, 2002

(51) Int. Cl.⁷ .................................................. G09G 5/00
(52) U.S. Cl. ........................ 345/168; 345/172; 345/156; 341/22
(58) Field of Search ................................ 345/168, 172, 345/156, 162; 341/20–22; 200/5 A, 5, 7, 341, 345; 400/472, 486; 340/825; 455/556.2

(56) References Cited

U.S. PATENT DOCUMENTS

| | | | | |
|---|---|---|---|---|
| 3,696,408 A | * | 10/1972 | Bouchard et al. ............. | 341/22 |
| 3,706,905 A | * | 12/1972 | Alexander .................. | 315/367 |
| 3,765,014 A | * | 10/1973 | Taylor ......................... | 341/32 |
| 4,291,385 A | * | 9/1981 | Osborne et al. ............ | 708/146 |
| 4,292,515 A | * | 9/1981 | Nelson ....................... | 250/229 |
| 4,602,138 A | * | 7/1986 | Berutto et al. .............. | 200/534 |
| 4,712,092 A | * | 12/1987 | Boldridge et al. ............ | 341/34 |
| 5,586,324 A | | 12/1996 | Sato et al. ................... | 395/652 |
| 5,790,103 A | * | 8/1998 | Willner ....................... | 345/168 |
| 5,867,729 A | | 2/1999 | Swonk ......................... | 395/828 |
| 5,880,712 A | | 3/1999 | Goldman ..................... | 345/168 |
| 5,917,905 A | * | 6/1999 | Whipple et al. ....... | 379/356.01 |
| 6,014,131 A | * | 1/2000 | Barry et al. ................. | 345/172 |
| 6,310,608 B1 | * | 10/2001 | Kaply et al. ................ | 345/168 |
| 2002/0154037 A1 | * | 10/2002 | Houston ...................... | 341/21 |

FOREIGN PATENT DOCUMENTS

JP       61-221922 A    * 10/1986

* cited by examiner

Primary Examiner—Vijay Shankar
Assistant Examiner—Leonid Shapiro
(74) Attorney, Agent, or Firm—John E. Campbell; Floyd A. Gonzalez; James E. Murray

(57) ABSTRACT

Each keyboard key is marked with a self-defining indicator. A matrix of key sensing circuits for the keyboard are configured to detect this indicator when the keys are depressed and provide an output to a keyboard controller which in turn provides key signals to the keyboard's connector that is indistinguishable by a computer system from the output of a standard QWERTY keyboard. This enables the disabled user to carry this keyboard from one computer system to another and simply exchange it for the standard keyboard for the computer. There are no changes required to be made to the computer's operating system or any software of the computer in order to allow the disabled user to use the computer. Furthermore, other users are not required to reconfigure the computer system after the standard keyboard has been re-installed.

19 Claims, 4 Drawing Sheets

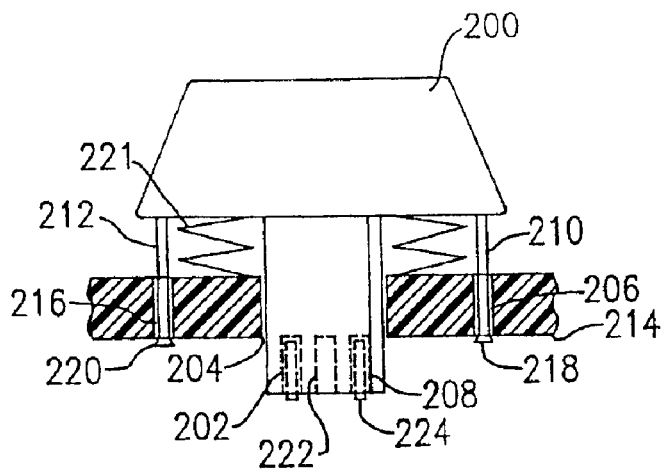
FIG.2
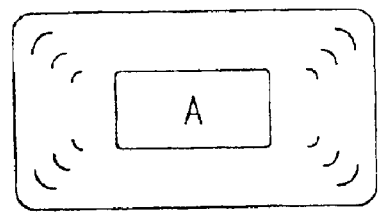
FIG.4
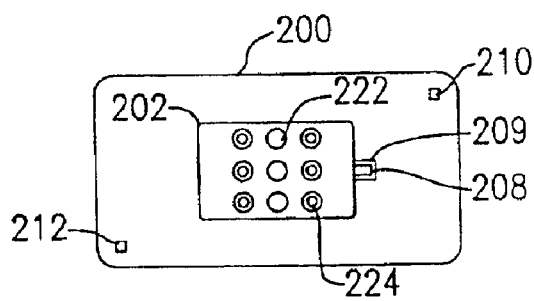
FIG.3
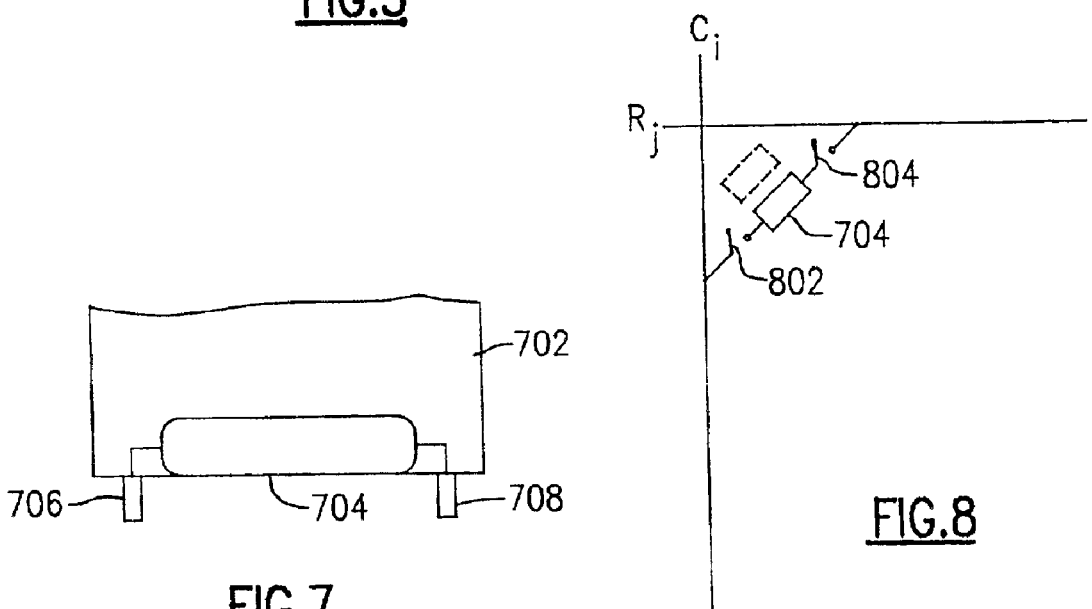
FIG.7
FIG.8

INTERCHANGEABLE KEYBOARD WITH SELF DEFINING KEYS

RELATED APPLICATION

U.S. patent application Ser. No. 09/841,626, filed on even date herewith and entitled "Reformable Keyboard with Variable Key Design".

FIELD OF THE INVENTION

The present invention relates to the field of computer keyboards and more particularly, to the layout of computer keyboards for use by the disabled.

BACKGROUND OF THE INVENTION

The disabled are presented with a number of challenges which other users take for granted when it comes to using computer systems. Most people take it for granted that we can walk up to any personal computer and start typing. However, there are a variety of disabilities which make it difficult or impossible for some people to use a standard keyboard layout. For example, a person with a handicap affecting one hand may do better if the most commonly used keys were all aligned within the range of the other hand. Meanwhile, the cognitively disabled may find that an alphabetically arranged keyboard serves them best. In any case there is not one keyboard layout that would accommodate all handicaps. Computer keyboard layouts have to be tailored to the disabilities of the particular individual.

Most computer keyboards are made up of keys, each with a cap and an underlying key post, and a detection mechanism that registers that a key has been pressed. Once pressed, the key sends a key code to the computer system indicating which key was pressed, and software interprets the key stroke. There are many keyboards where the keys snap in and out of place. Such keyboards could be remapped for the disabled by moving keys and then redefining the keyboard's layout to the computer's operating system. While this mix of activities may not be a major hurdle for those skilled in computer systems, it is beyond the abilities of most of the disabled or those who assist the disabled in adjusting to their environment. This leaves a disabled individual unable to use computer systems or require him/her to search for an expert to specifically reconfigure a computer system to their needs. Once reconfigured, that computer system then becomes a problem for others to use. Further the disabled individual is unable to apply skills required with the use of the modified computer system to other computer systems.

Therefore it is an object of the present invention to provide a keyboard which can be easily reconfigured to accommodate the handicaps of a specific user.

It is another object of the present invention to provide a modified keyboard that can be used with any computer system without requiring special programming or modification of the computer system.

BRIEF DESCRIPTION OF THE INVENTION

In accordance with the present invention, each keyboard key is marked with a self-defining indicator. A matrix of key sensing circuits for the keyboard are configured to detect this indicator when the keys are depressed and provide an output to a keyboard controller which in turn provides key signals to the computer interface connector of the keyboard which signals are indistinguishable by a computer system from the output of a standard keyboard. This enables the disabled user to carry the keyboard of the present invention from one computer system to another and simply exchange it for the standard keyboard for the computer. There are not changes required to be made to the operating system or any software of the computer in order to allow the disabled user to use the computer. Furthermore, other users are not required to do anything special to start using the computer system once the standard keyboard is re-installed.

BRIEF DESCRIPTION OF THE DRAWINGS

The present invention and its object features and advantages can be best understood by reading the following description of embodiments thereof while referring to the attached figures of which:

FIG. 2 is a side view of a key incorporating the present invention;

FIG. 3 is a bottom view of the key of FIG. 2;

FIG. 4 is a top view of the key of FIGS. 2 and 3;

FIG. 7 is an alternative design for keys in accordance with the present invention; and FIG. 8 is a position in a matrix designed to accommodate keys in accordance with the design of FIG. 7.

DESCRIPTION OF THE PREFERRED EMBODIMENT

Figure 1:
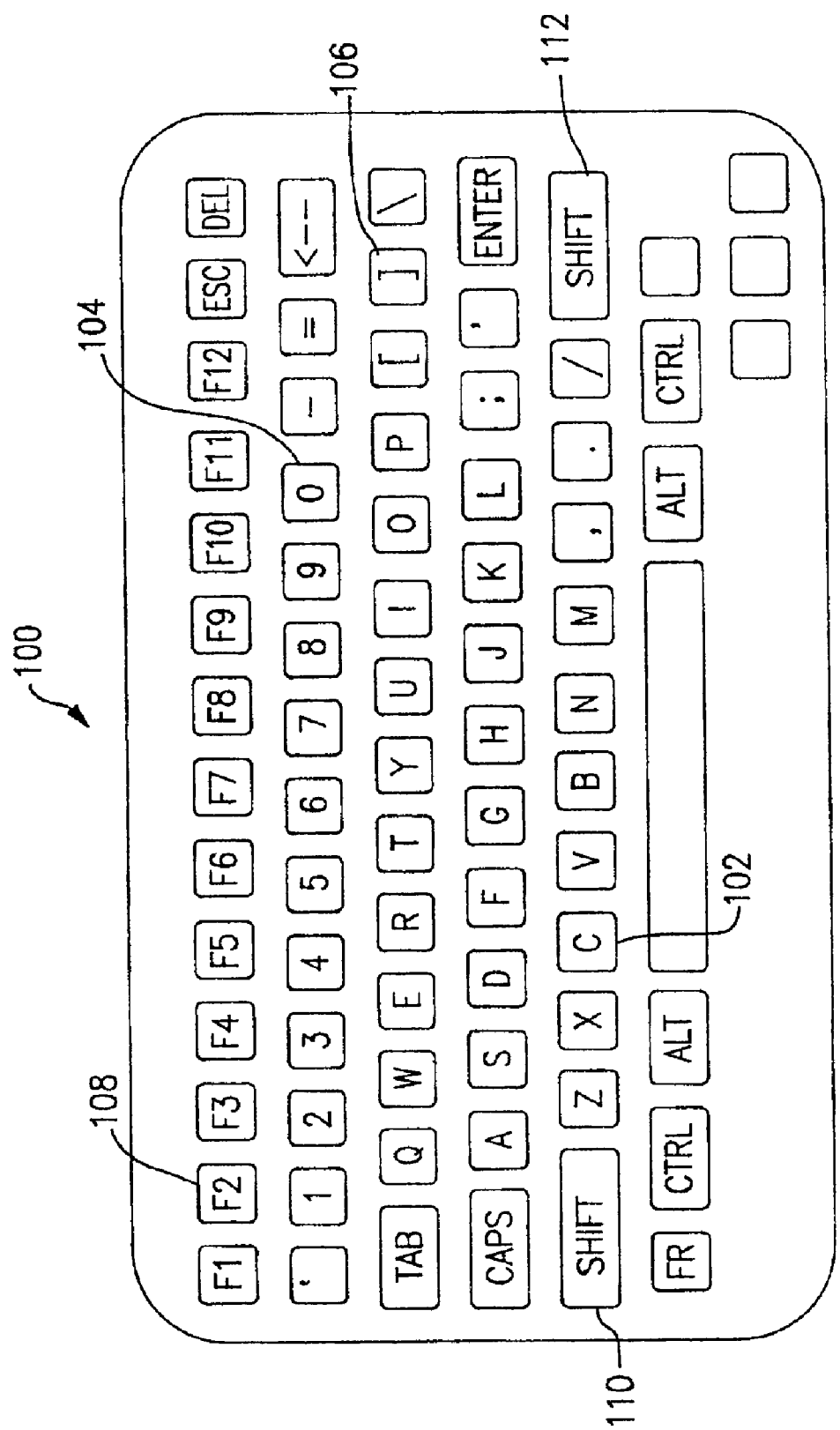
FIG. 1 is a plan view of a standard QWERTY keyboard layout.

FIG. 1 shows a keyboard with a standard QWERTY layout. Included in the keyboard 100 are a plurality of well-known alphanumeric control key members 102 having indicia 104 representing the character to be printed. The keyboard further includes a plurality of operating keys 106 and row of customer programmable keys 108. the keyboard includes two shift keys 110 and 112 for use in notifying the processing unit to shift the data of a depressed control key 102 from the lower case to the upper case.

For many disabled users the standard QWERTY layout of FIG. 1 is difficult or impossible to use and a different positional arrangement of keys on the keyboard would be more suitable. For instance, certain of the disabled may have very limited use of say the left hand and need a keyboard with the more commonly used keys grouped on the right side, or people with limited cognitive ability may require keys to be arranged in alphabetical order. The keys in most keyboards are removable and can be changed from position to position on the keyboard. However in order for a computer to properly interpret keystrokes, the computer must be reprogrammed to recognize the modified keyboard configuration.

In accordance with the present invention, the keys are each imprinted with information that identifies their function making their position on the keyboard transparent to the computer to eliminate the necessity for reprogramming the computer. As shown in FIGS. 2 to 4, a lettered keycap 200 is fixedly mounted on a key post 202. The key post 202 extends through an opening 204 in the top surface 206 of the keyboard and contains a ridge 208 that is positioned in a guide slot 209 to assure the key is properly oriented in the keyboard. Two diagonally positioned flexible legs 210 and 212 slide in paths 214 and 216 to act as guides for the vertical movement of the key while permitting easy removal and insertion of the keys. Feet 218 and 220 at the end of the legs hold the key in position against upward spring action 221 between the cap and the top surface of the keyboard. The keys are plastic with the keycap, legs, and post molded in one piece.

The bottom of the key post contains eight cylindrical cavities 222. Metallic studs or pins 224 are inserted into certain of the cavities in accordance with the USA Standard Code for Information Interchange (ASCII), to uniquely identify each of the keys by a combination of the number studs assigned to the key and their positions in the cavities of the key. While the ASCII code is preferred, other codes are possible. With 0 to 8 pins positioned or not positioned in various combinations in the cavities, there are 256 different possible combinations ranging from the case where all cavities are empty to that where all cavities are full. The condition where all the cavities are empty is not used as a key code, leaving 255 different pin-cavity combinations to uniquely identify each of 256 different letters, number and function keys. The keyboard of FIG. 1 has 85 keys. Therefore there are sufficient combinations to identify each of the keys in that keyboard and for extended keyboard layouts.

Figure 5:
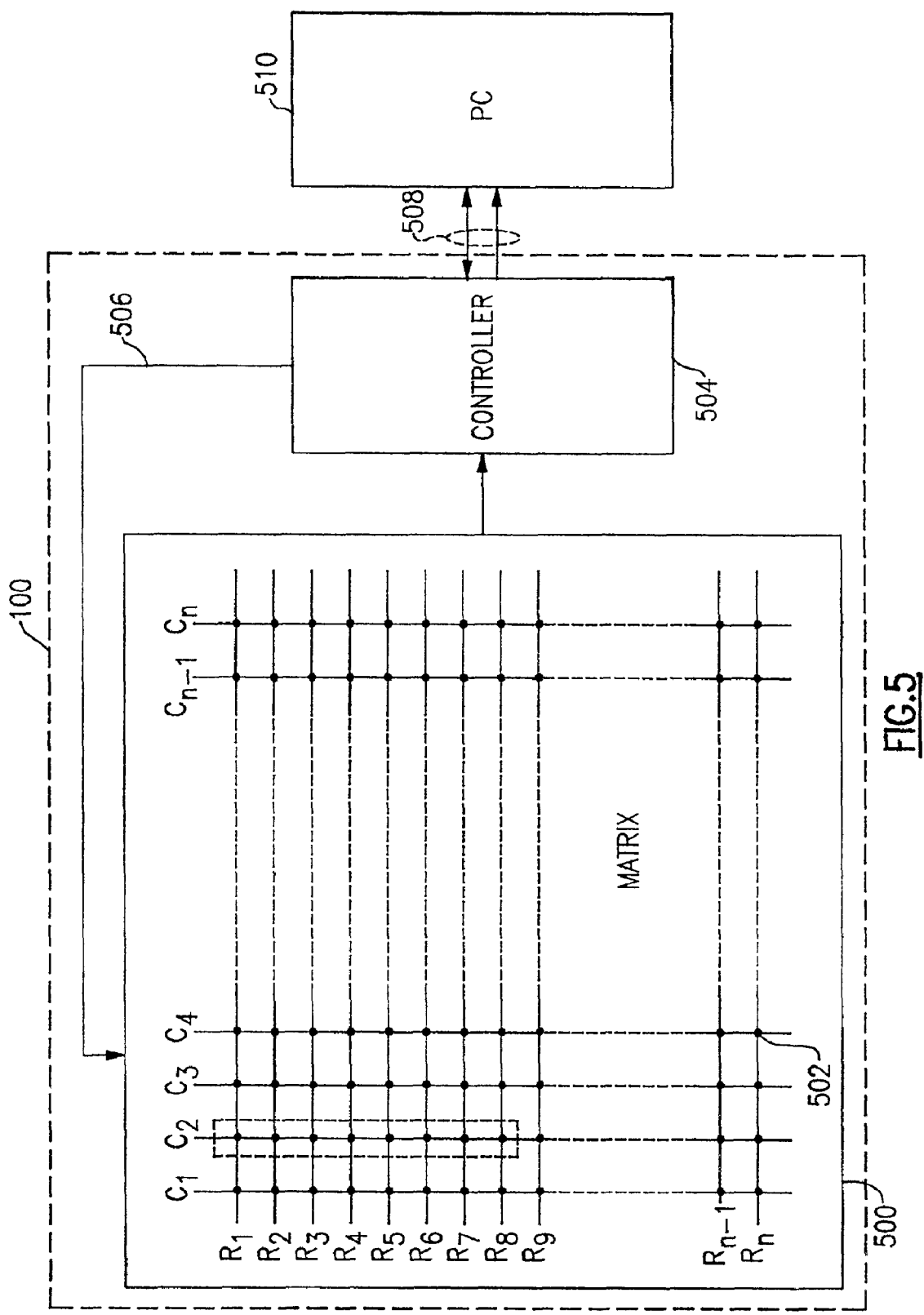
FIG. 5 is a schematic of a switch matrix and controller for use in a keyboard having the keys of FIGS. 2 to 4.

Referring now to FIG. 5, a switch matrix unit 500 is utilized in the keyboard 100 for outputting a signal representing the depression of any key in the keyboard 100 of FIG. 1. This matrix unit includes a plurality of input row conductors $R_1-R_n$ inclusive and a plurality of output column conductors $C_1-C_n$ inclusive. The row and column conductors have at each of their intercepts a capacitive device 502 associated with a different key member of the keyboard of FIG. 1. A controller 504 in the keyboard 100 detects a multi-bit binary signal called a make code when a key is depressed and a break code when the key is released. Both the make and break code signals are detected to eliminate any false or missed key signal which may occur when the make codes for more than two keys overlap.

To produce the make and break code signals, each column conductor $C_1$ to $C_n$ is successively scanned by a strobe pulse in a manner that is well known in the art. The strobe pulse is generated by the controller and provided to the matrix on connection 506. If any key on a column has been depressed at the time of the generation of a scanning strobe pulse, for that column, at least one row conductor for the key will be energized by the strobe pulse to produce a make code pulse, which pulse will be transmitted over the energized row conductor to the keyboard controller 504 which generates the proper multi-bit scan code representing the depressed key at the keyboard interface 508 with a computer 510 through a standard keyboard connector which, with certain exceptions, will plug into any computer and enable the keyboard providing the proper scan codes to operate with that computer.

In the matrix of FIG. 5, eight switches are associated with each key position on the keyboard. For instance, the capacitive devices in positions $R_1-C_2$ to $R_8-C_2$ are associated with one key position. While the capacitive devices in positions $R_1-C_2$ to $R_8-C_2$ are shown arranged in a single line, they are actually clustered under the key post position with each capacitive device positioned under one of the cavities in the bottom of the key post so that it can be activated by a metal pin positioned in that cavity. In this way, the number of pins associated with a key and their position in the key, generate a binary signal which is a combination of eight "0s" and "1s" when the key is depressed, a different combination of "0s" and "1s" for each key in the keyboard. While the described keyboard uses capacitive switches in which the studs change the state of the capacitive switches to indicate to the controller that a key being depressed, other arrangements are possible. They can include use of a mechanical keyboard where studs make physical contact to close a connection or a keyboard in which key switches are contained in membrane layers.

Figure 6:
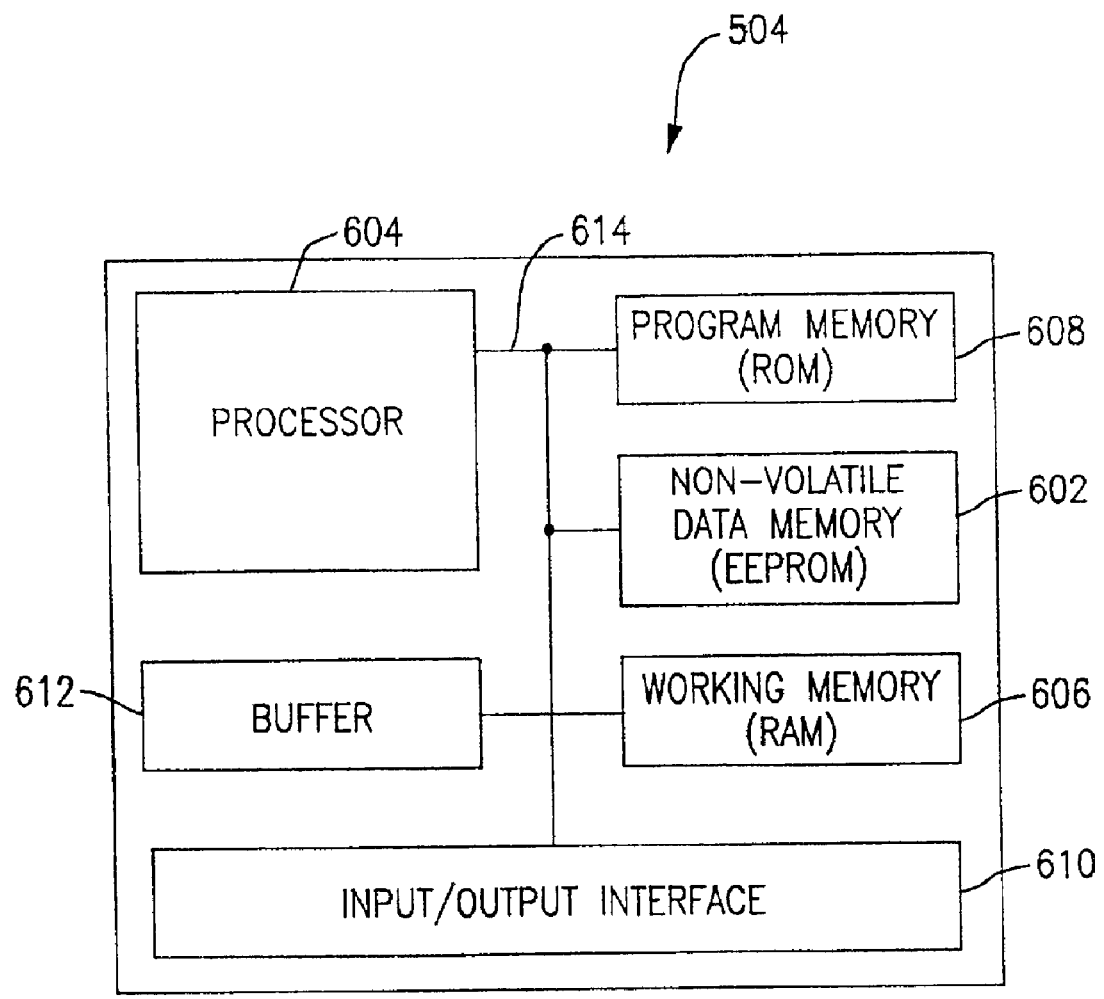
FIG. 6 is a block diagram of the controller of FIG. 5.

As shown in FIG. 6, the controller 504 includes: a microprocessor 604; a volatile working memory 606; a read only memory (ROM) 608 containing the microprocessors operating system and application software; and an input/output interface 610 and a buffer 612 used in interfacing the computer 510 and the matrix 500 through the bus 614 to the other elements of the controller. The keyboard controller 504 also includes a look up table in a non-volatile memory 602 in which the parallel eight bit key make codes for each of the keyboard keys are stored along with the corresponding serial multi-bit scan codes to be provided to the CPU 510. The controller 504 recognizes a break code received from the switch matrix as one stored in the lookup table in non volatile memory and transmits the corresponding scan code to the keyboard-PC interface 508. The scan code is transmitted to the computer 510 through the keyboard buffer for instance to a second keyboard controller located in the computer where they are recognized as the appropriate characters or control codes.

An alternate form of keyboard keys in accordance with the present invention is shown in FIG. 7. In FIG. 7, the key post 702 in each key contains a logic circuit 704 electrically connected to two studs 706 and 708. The circuit 704 contains a key identifier that uniquely identifies each key in accordance with the previously described ASCII code scheme. As shown in FIG. 8 each key is located over one intersection of a row $R_j$ and $C_j$ in a matrixof such columns and rows. When a key is depressed switches 802 and 804 are closed completing a circuit through the circuit energizing the circuit 704 from voltage on the column conductor $C_j$. Then the ASCII code signals of the key identifier are serially transmitted along the row line $R_j$ to the controller 504 which is adapted to received a serial input of the identifier.

Above we have described two embodiments of the present invention. Of course those skilled in the art may provide modifications of the described embodiments for instance the interface terminal on the keyboard could be USB connector and the on board keyboard controller could be programmed to communicate with the computer through the USB interface. Therefore it is understood that the invention is not limited to the described embodiments but encompasses the spirit and scope of the appended claims.

I claim:

1. Data entry device comprising:
   a keyboard having a plurality of multifunction key positions with at least a separate multifunction key position for each alphabetic character;
   a plurality of movable keys each key containing an inscription on the keycap thereof representing a character or function and containing a multi-bit binary code therein identifying the character or function on the keycap, each of said keys being capable of being selectively positioned in any one of the key positions in the keyboard and being responsive to user contact to the keycaps thereof;
   an uncoded circuit matrix of detectors disposed below said keyboard each of said circuit matrix detectors being capable of detecting the binary code of any one of the keys when that any one of the keys is positioned above it and is contacted to produce an electrical signal representative of the binary code associated with the contacted key;

a standard interface connector to connect the keyboard to a computer; and a read only controller providing a different response for each binary code on a key for converting the output of the circuit matrix for any contacted key to one which is recognizable by the computer so that the output of the keyboard provided to the standard interface connector correctly identifies the contacted keys character or function to the computer irrespective of the position of the key on the keyboard.

2. The data entry device of claim 1, wherein the controller includes only a single read only look-up table responsive to the multi-bit output of the circuit matrix the multi-bit codes for each of the keys to provide a standard scan code signal recognizable by any computer compatible with the interface connector irrespective of the keys position of the position of the key.

3. The data entry device of claim 2 wherein the keys have in the base of the key a plurality of locations each representing one digit in the multi-bit binary code and one or more pins each positioned one of the locations so that the keys all contain a different combination of locations with posts and without posts to identify them distinctively from the other keys in accordance with the multi-bit binary code.

4. The data entry device of claim 2 wherein the keys each have a circuit embedded therein storing the multi-bit binary code identifying each key distinctively from the other keys and have electrical contacts providing excitation to the circuit and connecting it to the matrix to provide a multi-bit code signal to the controller to identify the key.

5. The data entry device of claim 3 wherein the circuit matrix provides the bits of the multi-bit binary code to the controller in parallel.

6. The data entry of claim 4 wherein the circuit matrix provides the bits of the multi-bit binary code to the controller serially.

7. The data entry device of claim 2 wherein the circuit matrix contains a plurality of capacitive switches each switch responsive to one of the pins to generate a key make signal.

8. The data entry device of claim 2 wherein the keyboard has openings to accept the keys and expose the multi-bit binary code stored therein to the circuit matrix wherein the keys are spring loaded with arms with feet that hold the keys in position and are flexible to enable removal of the key and the binary code therein from the keyboard to permit selective placement of the keys in desired keyboard locations.

9. Data entry device for the disabled comprising:

a keyboard having a plurality of multifunction key positions with at least a separate multifunction key position for each alphabetic character;

a set of movable keys each key of the set containing an inscription on the keycap thereof representing a different character or function of the key in the set and containing a multi-bit binary code stored therein identifying the character or function of the particular key, said keys being capable of being positioned in any one of the key positions in the keyboard so that any key and its character identifying code can be placed in any key position, said keys being responsive to user contact to the keycaps thereof, a circuit matrix disposed below and in a fixed relationship to said keyboard, said circuit matrix having detection positions for each of the plurality of keys which detection position are each capable of detecting the binary code of any one of the keys when that key is contacted to produce an electrical signal representative of the binary code associated with the contacted key;

a standard interface connector to connect the keyboard to any computer compatible with the interface; and a read only controller providing a different response for each key carried binary code identifying its key for converting the output of the circuit matrix for any contacted key to one which is recognizable by the computer so that the output of the keyboard provided to the standard interface connector correctly identifies the contacted keys character or function to the computer irrespective of the position of the contacted key on the keyboard so that the key can be moved to configure the keys on the keyboard in accordance with a users disability.

10. The data entry device of claim 9, wherein the controller includes only a single read only look-up table responsive to the multi-bit output of the circuit matrix for each of the keys to provide a standard scan code signal recognizable by any computer compatible with the interface connector which does not depend on the keys position in the keyboard.

11. The data entry device of claim 9 wherein the keys have in the base of the key and movable with key a plurality of locations each representing one digit in the multi-bit binary code and one or more pins each positioned one of the locations so that the keys all contain a different combination of locations with posts and without posts to identify them distinctively from the other keys in accordance with the multi-bit binary code.

12. The data entry device of claim 9 wherein the keys each have a circuit embedded therein storing the multi-bit binary code identifying each key distinctively from the other keys and have electrical contacts providing excitation to the circuit and connecting it to the matrix to provide a multi-bit code signal to the controller to identify the key.

13. The data entry device of claim 10 wherein the circuit matrix provides the bits of the multi-bit binary code to the controller in parallel.

14. The data entry device of claim 11 wherein the circuit matrix provides the bits of the multi-bit binary code to the controller serially.

15. The data entry device of claim 10 wherein the circuit matrix contains a plurality of capacitive switches each switch responsive to one of the pins to generate a key make signal.

16. The data entry device of claim 7 wherein the keyboard openings accept the keys and expose the multi-bit binary code stored therein to the circuit matrix wherein the keys are spring loaded with arms with feet that hold the keys in position which arms are flexible to enable removal of each of the keys and the binary code therein from the keyboard independently of the other keys so that removal and replacement of one key does not require movement of adjacent keys to permit selective placement of the keys in desired keyboard locations.

17. The data entry device of claim 7 wherein the keyboard openings accept the keys and expose the multi-bit binary code stored therein to the circuit matrix wherein the keys are spring loaded with arms with feet that hold the keys in position which arms are flexible to enable removal of each of the keys and the binary code therein from the keyboard independently of the other keys to permit selective placement of the keys in desired keyboard locations without disturbing other keys.

18. The data entry device of claim 9, wherein the multifunction key position includes a plurality of spaced keyboard openings in the top surface of the keyboard, one opening for each key position.

19. Data entry device for the disabled comprising:

a keyboard having a plurality of universal key positions, at least a separate universal key position for each alphabetic character each position having an opening in a top surface of the keyboard;

a set of movable keys each key of the set containing an inscription on the keycap thereof representing a different character or function of the key in the set and containing a multi-bit binary code stored therein identifying the character or function of the particular key, each key being capable of being positioned through the opening for any one of the key positions in the keyboard so that any key and its character identifying code can be placed in any key position desired by a disabled user without disassembly of the keyboard, said keys being responsive to user contact to the keycaps thereof, a circuit matrix disposed below and in a fixed relationship to said keyboard, said circuit matrix having detection positions a different one aligned with each of the openings for each of the plurality of keys, which detection positions are each capable of detecting the binary code of any one of the keys when that key positioned in its aligned opening is contacted by the disabled user to produce an electrical signal representative of the binary code associated with the contacted key;

a controller for converting the output of the circuit matrix for any contacted key to one which is recognizable by the computer as the code for the character or function represented by the inscription on the contacted key so that the output of the keyboard provided to the standard interface connector correctly identifies the contacted keys character or function to the computer irrespective of the position of the contacted key on the keyboard; and a standard interface adapter for transmission of converter outputs so that the keys can be moved to position the keys on the keyboard to accommodate the users disability without otherwise modifying or disassembly of the keyboard or modifications of keyboard or computer software.

\* \* \* \* \*